(12) United States Patent
Tzikas et al.

(10) Patent No.: US 6,623,533 B2
(45) Date of Patent: Sep. 23, 2003

(54) METHOD FOR PRINTING CELLULOSIC FIBER MATERIALS WITHOUT AN ADDITIONAL FIXING PROCESS STEP

(75) Inventors: Athanassios Tzikas, Pratteln (CH); Hans Reichert, Rheinfelden (DE); Herbert Klier, Efringen-Kirchen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 16 days.

(21) Appl. No.: 09/899,439

(22) Filed: Jul. 5, 2001

(65) Prior Publication Data

US 2002/0032318 A1 Mar. 14, 2002

(30) Foreign Application Priority Data

Jul. 7, 2000 (EP) .............................. 00810594

(51) Int. Cl.[7] .................................. D06P 1/38
(52) U.S. Cl. ................................. 8/549; 8/918
(58) Field of Search ........................ 8/549, 918

(56) References Cited

U.S. PATENT DOCUMENTS 3,474,084 A  10/1969  Griffiths et al. ............. 260/153

(List continued on next page.)

FOREIGN PATENT DOCUMENTS

EP        755985   * 1/1997

OTHER PUBLICATIONS

Derwent Abstr. 90–037773/06 for EP 0354409 (1990).
Derwent Abstr. 1988–209169 [30] for JP 63145379 (1988).

*Primary Examiner*—Margaret Einsmann
(74) *Attorney, Agent, or Firm*—Kevin T. Mansfield

(57) ABSTRACT

A method of printing cellulosic fiber materials in which the fiber material is brought into contact with reactive dyes of formula:

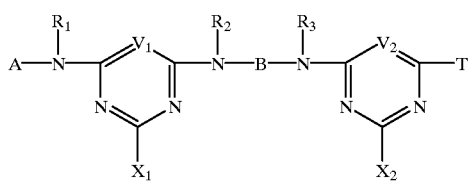

(1)

wherein

A is the radical of a monoazo, polyazo, metal complex azo, anthraquinone, phthalocyanine, formazan or dioxazine chromophore, $R_1$, $R_2$ and $R_3$ are each independently of the others hydrogen or unsubstituted or substituted $C_1$–$C_4$alkyl, $X_1$ and $X_2$ are halogen, B is an organic bridging member, T is a reactive radical of formula:

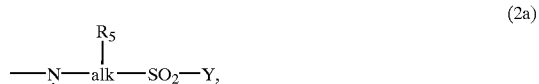

(2a)

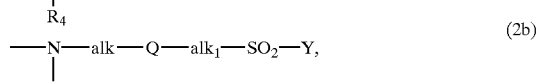

(2b)

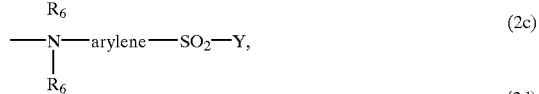

(2c)

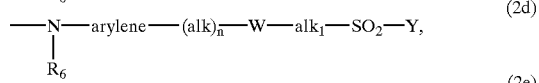

(2d)

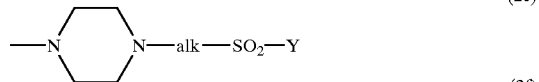

(2e)

or

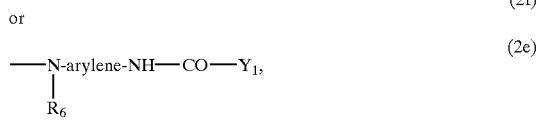 (2e)

$R_4$ is hydrogen, $C_1$–$C_4$alkyl unsubstituted or substituted by hydroxy, sulfo, sulfato, carboxy or by cyano, or a radical

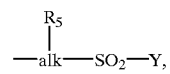

wherein $R_5$ is as defined hereinbelow, $R_5$ is hydrogen, hydroxy, sulfo, sulfato, carboxy, cyano, halogen, $C_1$–$C_4$alkoxycarbonyl, $C_1$–$C_4$alkanoyloxy, carbamoyl or a group —$SO_2$—Y, $R_6$ is hydrogen or $C_1$–$C_4$alkyl, alk and $alk_1$ are each independently of the other linear or branched $C_1$–$C_6$alkylene, arylene is an unsubstituted or sulfo-, carboxy-, hydroxy-, $C_1$–$C_4$alkyl-, $C_1$–$C_4$alkoxy- or halo-substituted phenylene or naphthylene radical, Y is vinyl or a radical —$CH_2$—$CH_2$—U and U is a leaving group, $Y_1$ is a group —CH(Hal)-$CH_2$(Hal) or —C(Hal)=$CH_2$, wherein Hal is chlorine or bromine, W is a group —$SO_2$—$NR_6$—, —$CONR_6$— or —$NR_6CO$—, wherein $R_6$ is as defined hereinabove, Q is a radical —O— or —$NR_6$—, wherein $R_6$ is as defined hereinabove, n is the number 0 or 1, and $V_1$ and $V_2$ are each independently of the other N, C—H, C—Cl or C—F, and the fixing of the printed fiber material is carried out without an additional fixing process step.

The prints obtained are distinguished by brilliant colour shades and good allround properties.

12 Claims, No Drawings

U.S. PATENT DOCUMENTS

| | | | |
|---|---|---|---|
| 4,725,674 A | 2/1988 | Segal et al. | 534/637 |
| 4,925,928 A | 5/1990 | Tzikas | 534/618 |
| 5,196,032 A | 3/1993 | Oschatz | 8/543 |
| 5,936,073 A | * 8/1999 | Phillips et al. | |
| 5,989,297 A | 11/1999 | Reichert et al. | 8/549 |

* cited by examiner

METHOD FOR PRINTING CELLULOSIC FIBER MATERIALS WITHOUT AN ADDITIONAL FIXING PROCESS STEP

The present invention relates to a simplified method of printing cellulosic fibre materials in which a separate fixing process, such as the steaming of the printed fibre material, is superfluous. The method is simplified by the use of certain reactive dyes which are distinguished by at least three fibre-reactive groups, at least two of the said fibre-reactive groups being halotriazinyl radicals and at least one being especially of the vinylsulfonyl type. The present invention relates also to the novel reactive dyes.

Methods of printing cellulosic fibre materials have been known for a long time. The class of the reactive dyes has been successful in the face of the ever increasing demands in terms of colour fastness. In printing procedures on cellulose fibres that employ reactive dyes, use is made of the particularly stable covalent binding of the dyes to the hydroxy groups of the fibres. The binding of the reactive dyes to the fibres (fixing) is carried out in alkaline medium and requires treatment of the printed fibre material in a separate fixing process, which is usually carried out with saturated steam at relatively high temperatures (steaming), in order to achieve uniform and optimum fixing of the dye. In the hitherto known methods, such a treatment requires an additional device in which the necessary fixing heat and the steam are generated. There is accordingly a need for a simplified printing method that can be used on an industrial scale in which the additional process step of fixing the dye does not need to be carried out and in which uniform and optimum fixing is, for example, achieved directly on drying the printed fibre material. The advantage of such a simplified method is especially that expenditure in terms of time and cost is distinctly lower than in the case of the hitherto customary printing methods, since it is possible to omit the additional process step of fixing the dye and thus dispense with the additional fixing device.

The present invention accordingly relates to a method of printing cellulosic fibre materials in which the fibre material is brought into contact with reactive dyes of formula:

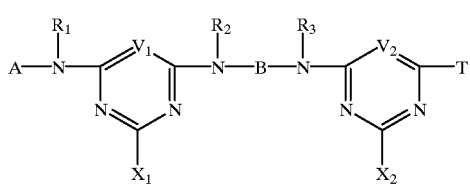

(1)

wherein

A is the radical of a monoazo, polyazo, metal complex azo, anthraquinone, phthalocyanine, formazan or dioxazine chromophore, $R_1$, $R_2$ and $R_3$ are each independently of the others hydrogen or unsubstituted or substituted $C_1$–$C_4$alkyl, $X_1$ and $X_2$ are halogen, B is an organic bridging member, T is a reactive radical of formula:

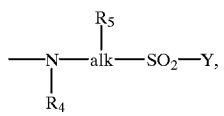 (2a)

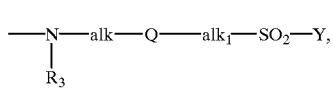 (2b)

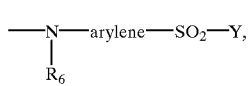 (2c)

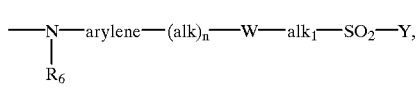 (2d)

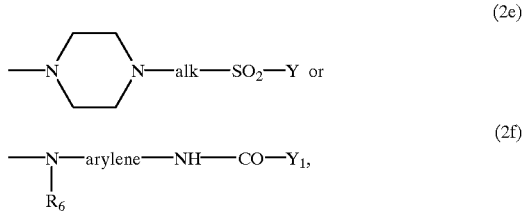 (2e)

(2f)

$R_4$ is hydrogen, $C_1$–$C_4$alkyl unsubstituted or substituted by hydroxy, sulfo, sulfato, carboxy or by cyano, or a radical

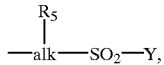

wherein $R_5$ is as defined hereinbelow, $R_5$ is hydrogen, hydroxy, sulfo, sulfato, carboxy, cyano, halogen, $C_1$–$C_4$alkoxycarbonyl, $C_1$–$C_4$alkanoyloxy, carbamoyl or a group —$SO_2$—Y, $R_6$ is hydrogen or $C_1$–$C_4$alkyl, alk and $alk_1$ are each independently of the other linear or branched $C_1$–$C_6$alkylene, arylene is an unsubstituted or sulfo-, carboxy-, hydroxy-, $C_1$–$C_4$alkyl-, $C_1$–$C_4$alkoxy- or halo-substituted phenylene or naphthylene radical, Y is vinyl or a radical —$CH_2$—$CH_2$—U and U is a leaving group, $Y_1$ is a group —CH(Hal)-$CH_2$(Hal) or —C(Hal)=$CH_2$, wherein Hal is chlorine or bromine, W is a group —$SO_2$—$NR_6$—, —$CONR_6$— or —$NR_6CO$—, wherein $R_6$ is as defined hereinabove, Q is a radical —O— or —$NR_6$—, wherein $R_6$ is as defined hereinabove, n is the number 0 or 1, and $V_1$ and $V_2$ are each independently of the other N, C—H, C—Cl or C—F, and the fixing of the printed fibre material is carried out without an additional fixing process step.

Within the context of the present invention, "an additional fixing process step" denotes the treatment of the fibre material, after the printing and after the drying immediately subsequent thereto, in a separate fixing device at relatively high temperatures, which step is usually carried out in the presence of saturated steam (steaming).

According to the invention, the fixing of the dye on the fibre material has already been achieved immediately after the printing and also the drying of the fibre material, which is to be carried out anyway.

Preferably, the method according to the invention is carried out industrially on a large scale.

As alkyl radicals in the reactive dye of formula (1), the radicals $R_1$, $R_2$ and $R_3$ are straight-chain or branched. The alkyl radicals may be further substituted, for example by hydroxy, sulfo, sulfato, cyano or carboxy. The following radicals may be mentioned as examples: methyl, ethyl, propyl, isopropyl, butyl, isobutyl, sec-butyl and tert-butyl, and the corresponding radicals substituted by hydroxy, sulfo, sulfato, cyano or carboxy. Preferred substituents are hydroxy, sulfo or sulfato, especially hydroxy or sulfato and preferably hydroxy.

Preferably, $R_1$ is hydrogen or $C_1$–$C_4$alkyl, especially hydrogen.

$R_2$ and $R_3$ are preferably each independently of the other hydrogen, or $C_1$–$C_4$alkyl unsubstituted or substituted by hydroxy, sulfo, sulfato, cyano or by carboxy. According to one embodiment of interest, one of the radicals $R_2$ and $R_3$ is $C_1$–$C_4$alkyl substituted by hydroxy, sulfo, sulfato, cyano or by carboxy, especially by hydroxy, and the other of the radicals $R_2$ and $R_3$ is hydrogen or $C_1$–$C_4$alkyl, especially hydrogen.

Especially preferably, $R_2$ and $R_3$ are each independently of the other hydrogen or $C_1$–$C_4$alkyl, especially hydrogen.

$X_1$ and $X_2$ are, for example, chlorine, fluorine or bromine.

$X_1$ and $X_2$ are preferably each independently of the other chlorine or fluorine. Especially preferably, one of the radicals $X_1$ and $X_2$ is fluorine and the other is chlorine, or $X_1$ and $X_2$ are both fluorine. More especially, one of the radicals $X_1$ and $X_2$ is fluorine and the other is chlorine.

$V_1$ and $V_2$ are preferably N.

The organic bridging member B may be, for example, an aliphatic, cycloaliphatic, aromatic or araliphatic bridging member.

As an aliphatic bridging member, B is, for example, a straight-chain or branched $C_2$–$C_{12}$-alkylene radical, especially a $C_2$–$C_6$alkylene radical, that may be interrupted by 1, 2 or 3 members from the group —NH—, —N(CH$_3$)— and especially —O— and that is unsubstituted or substituted by hydroxy, sulfo, sulfato, cyano or by carboxy. Hydroxy, sulfo or sulfato, especially hydroxy or sulfato, are preferred as substituents of the alkylene radicals mentioned for B.

As aliphatic bridging members for B there come into consideration also, for example, $C_5$–$C_9$-cycloalkylene radicals, especially cyclohexylene radicals. The said cycloalkylene radicals may be unsubstituted or substituted by $C_1$–$C_4$alkyl, $C_1$–$C_4$alkoxy, $C_2$–$C_4$alkanoylamino, sulfo, halogen or carboxy, especially by $C_1$–$C_4$alkyl. As aliphatic bridging members for B there may also be mentioned methylenecyclohexylene, ethylenecyclohexylene and methylenecyclohexylenemethylene radicals unsubstituted or substituted in the cyclohexylene ring by $C_1$–$C_4$alkyl, especially methyl.

For the radical of formula

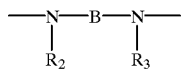

there comes into consideration, for example, also a radical of formula

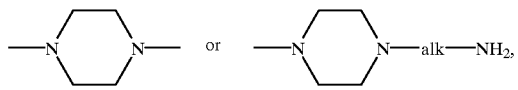

wherein alk is $C_1$–$C_4$alkylene, for example ethylene.

As an aromatic bridging member, B is, for example, unsubstituted or $C_1$–$C_4$alkyl-, $C_1$–$C_4$alkoxy-, $C_2$–$C_4$alkanoylamino-, sulfo-, halo- or carboxy-substituted $C_1$–$C_6$alkylenephenylene, for example methylenephenylene, $C_1$–$C_4$alkylenephenylene-$C_1$–$C_4$alkylene, for example methylenephenylenemethylene, or phenylene, or a radical of formula:

(3)

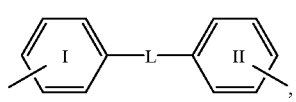

wherein the benzene rings I and II are unsubstituted or substituted by $C_1$–$C_4$alkyl, $C_1$–$C_4$-alkoxy, $C_2$–$C_4$alkanoylamino, sulfo, halogen or by carboxy and L is a direct bond or a $C_2$–$C_{10}$-alkylene radical that may be interrupted by 1, 2 or 3 oxygen atoms, or L is a bridging member of formula —CH=CH—, —N=N—, —NH—, —CO—, —NH—CO—, —NH—SO$_2$—, —NH—CO—NH—, —O—, —S— or —SO$_2$—. As an aromatic bridging member, B is preferably phenylene that may be substituted as indicated above. Preferably, the aromatic bridging members mentioned for B are unsubstituted or sulfo-substituted.

Examples of aromatic bridging members B are 1,3-phenylene, 1,4-phenylene, 4-methyl-1,3-phenylene, 4-sulfo-1,3-phenylene, 3-sulfo-1,4-phenylene, 3,6-disulfo-1,4-phenylene, 4,6-disulfo-1,3-phenylene, 3,7-disulfo-1,5-naphthylene, 4,8-disulfo-2,6-naphthylene, 2,2'-disulfo-4,4'-diphenylene, 4,4'-phenyleneurea-2,2'-disulfonic acid and 2,2'-disulfo-4,4'-stilbenylene.

B is preferably a $C_2$–$C_{12}$alkylene radical that may be interrupted by 1, 2 or 3 members from the group —NH—, —N(CH$_3$)— or —O— and that is unsubstituted or substituted by hydroxy, sulfo, sulfato, cyano or carboxy;

an unsubstituted or $C_1$–$C_4$alkyl-, $C_1$–$C_4$alkoxy-, $C_2$–$C_4$alkanoylamino-, sulfo-, halo- or carboxy-substituted $C_5$–$C_9$cycloalkylene radical, $C_1$–$C_6$alkylenephenylene radical or phenylene radical; or the radical of formula

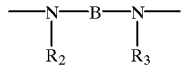

is a radical of formula

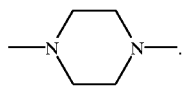

B is especially a $C_2$–$C_{12}$alkylene radical that may be interrupted by 1, 2 or 3 members —O— and that is unsubstituted or substituted by hydroxy, sulfo, sulfato, cyano or by carboxy, or is a phenylene radical that is unsubstituted or substituted by $C_1$–$C_4$alkyl, $C_1$–$C_4$alkoxy, $C_2$–$C_4$-alkanoylamino, sulfo, halogen or by carboxy.

B is more especially a $C_2$–$C_{12}$alkylene radical, especially a $C_2$–$C_6$alkylene radical, for example 1,2-ethylene, 1,3-propylene, 1,2-propylene, 1,4-butylene, 1,3-butylene, 1,5-pentylene, 3,5-pentylene, 1,6-hexylene, 2,5-hexylene, 4,6-hexylene or a radical of formula:

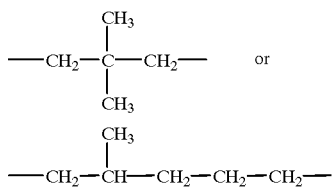

that may be interrupted by 1, 2 or 3 members —O— and that is unsubstituted or substituted by hydroxy or by sulfato, but preferably that is not interrupted by —O—.

Of particular importance as bridging members B are those of formula —$CH_2$—$CH(R_7)$— wherein $R_7$ is $C_1$–$C_4$alkyl, especially methyl, and especially 1,2-propylene.

Of particular importance also, as the radical

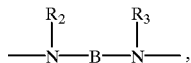

is a radical of formula:

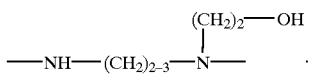

When Y is a radical —$CH_2$—$CH_2$—U, the leaving group U may be, for example, —Cl, —Br, —F, —$OSO_3H$, —$SSO_3H$, —OCO—$CH_3$, $OPO_3H_2$, —OCO—$C_6H_5$, $OSO_2$—$C_1$–$C_4$alkyl or —$OSO_2$—$N(C_1$–$C_4$alkyl$)_2$. Preferably, U is a group of formula —Cl, —$OSO_3H$, —$SSO_3H$, —OCO—$CH_3$, —OCO—$C_6H_5$ or —$OPO_3H_2$, especially —Cl or —$OSO_3H$ and more especially —$OSO_3H$.

Y is preferably vinyl, β-chloroethyl, β-sulfatoethyl, β-thiosulfatoethyl, β-acetoxyethyl, β-phenoxyethyl or β-phosphatoethyl and especially β-sulfatoethyl or vinyl.

Hal is preferably bromine.

alk and $alk_1$ are each independently of the other, for example, methylene, 1,2-ethylene, 1,3-propylene, 1,4-butylene, 1,5-pentylene, 1,6-hexylene or a branched isomer thereof. alk and $alk_1$ are each independently of the other preferably a $C_1$–$C_4$alkylene radical and especially an ethylene or propylene radical.

Preferred meanings of arylene are an unsubstituted or sulfo-, methyl-, methoxy- or carboxy-substituted 1,3- or 1,4-phenylene radical and especially an unsubstituted 1,3- or 1,4-phenylene radical.

$R_4$ is preferably hydrogen, $C_1$–$C_4$alkyl or a radical of formula

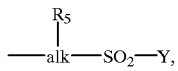

wherein $R_5$, Y and alk each have the definitions and preferred meanings given hereinabove. $R_4$ is especially hydrogen, methyl or ethyl and more especially hydrogen.

$R_5$ is preferably hydrogen.

$R_6$ is preferably hydrogen, methyl or ethyl and especially hydrogen.

The variable Q is preferably —NH— or —O— and especially —O—.

W is preferably a group of formula —CONH— or —NHCO—, especially a group of formula —CONH—.

The variable n is preferably the number 0.

Preferred reactive radicals T of formulae (2a) to (2f) are those wherein $R_4$, $R_5$ and $R_6$ are each hydrogen, Q is the radical —NH— or —O—, W is a group —CONH—, alk and $alk_1$ are each independently of the other ethylene or propylene, arylene is unsubstituted or methyl-, methoxy-, carboxy- or sulfo-substituted phenylene, Y is vinyl, β-chloroethyl or β-sulfatoethyl, especially vinyl or β-sulfatoethyl, $Y_1$ is —CHBr—$CH_2Br$ or —CBr=$CH_2$ and n is the number 0, the radicals of formulae (2c) and (2d) being especially preferred.

T is more especially a group of formula:

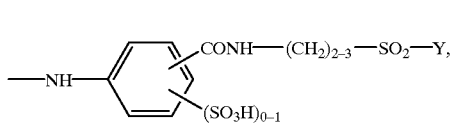

especially (2c'), in which formulae Y has the definitions and preferred meanings given hereinabove.

An especially important reactive radical T is the radical of formula:

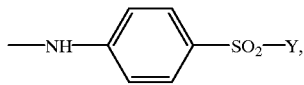

wherein Y is vinyl or β-sulfatoethyl.

When A is the radical of a monoazo, polyazo or metal complex azo chromophore, the following, especially, come into consideration:

chromophore radicals of a monoazo or disazo dye of formula $$D—N=N—(M—N=N)_u—K— \quad (4)$$

or $$—D—N=N—(M—N=N)_u—K \quad (5),$$

wherein D is the radical of a diazo component of the benzene or naphthalene series, M is the radical of a central component of the benzene or naphthalene series, K is the radical of a coupling component of the benzene, naphthalene, pyrazolone, 6-hydroxypyrid-2-one or acetoacetic acid arylamide series and u is the number 0 or 1, and wherein D, M and K may carry substituents customary for azo dyes, for example $C_1$–$C_4$alkyl or $C_1$–$C_4$alkoxy each unsubstituted or further substituted by hydroxy, sulfo or by sulfato; halogen, carboxy, sulfo, nitro, cyano, trifluoromethyl, sulfamoyl, carbamoyl, amino, ureido, hydroxy, carboxy, sulfomethyl, $C_2$–$C_4$alkanoylamino; benzoylamino unsubstituted or substituted in the phenyl ring by $C_1$–$C_4$alkyl, $C_1$–$C_4$alkoxy, halogen or by sulfo; phenyl unsubstituted or substituted by $C_1$–$C_4$alkyl, $C_1$–$C_4$alkoxy, halogen, carboxy or by sulfo; and fibre-reactive radicals. There also come into consideration the metal complexes derived from the dye radicals of formulae (4) and (5), such dye radicals being especially those of a 1:1 copper complex azo dye or 1:2 chromium complex azo dye of the benzene or naphthalene series, wherein the copper or chromium atom, as the case may be, is bonded to a metallisable group in the ortho position on both sides of the azo bridge.

When the chromophore radicals of formula (4) or (5) carry a reactive radical, the reactive radical may be, for example, of formula —SO$_2$—Y (6a), —CONH—(CH$_2$)$_m$—SO$_2$—Y (6b), —CONH—(CH$_2$)$_r$—O—(CH$_2$)$_m$—SO$_2$—Y (6c), —(O)$_p$—(CH$_2$)$_q$—CONH—(CH$_2$)$_m$—SO$_2$—Y (6d), —NH—CO—CH(Hal)-CH$_2$(Hal) (6e), —NH—CO—C(Hal)=CH$_2$ (6f)

or

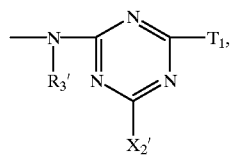
(6g)

in which formulae Y and Hal each have the definitions and preferred meanings given hereinabove, $T_1$ independently has the definitions and preferred meanings given hereinabove for T, $X_2'$ independently has the definitions and preferred meanings given hereinabove for $X_2$, $R_3'$ independently has the definitions and preferred meanings given hereinabove for $R_3$, p is the number 0 or 1 and l, m and q are each independently of the others an integer from 1 to 6. Preferably, p is the number 0,1 and m are each independently of the other 2 or 3 and q is the number 1, 2, 3 or 4.

When the chromophore radicals of formula (4) or (5) carry a reactive radical, the reactive radical preferably corresponds to the above formula (6a) or (6g).

Preferably, the chromophore radicals of formula (4) or (5) do not carry a reactive radical.

Especially preferred radicals of a monoazo or disazo chromophore A are as follows:

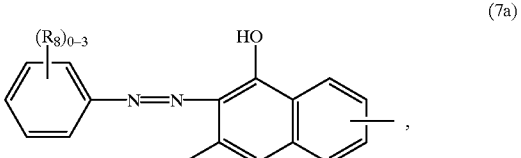
(7a)

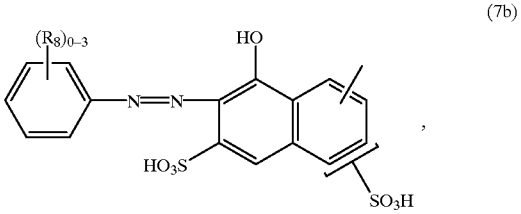
(7b)

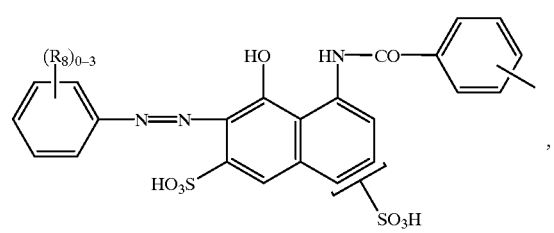
(7c)

in which formulae $(R_8)_{0-3}$ denotes from 0 to 3 identical or different substituents from the group $C_1$–$C_4$alkyl, $C_1$–$C_4$alkoxy, halogen, carboxy and sulfo,

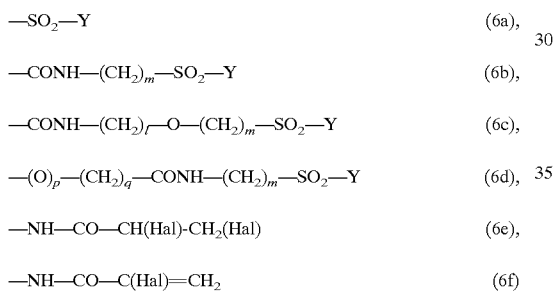
(7d)

(7e)

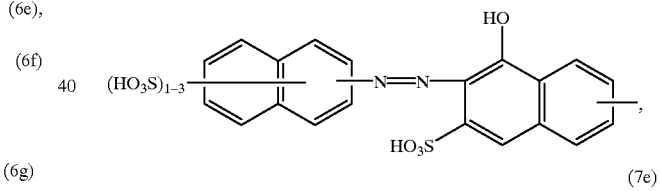

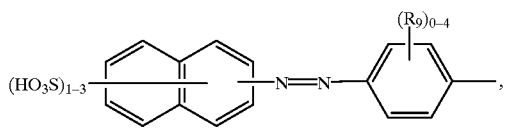

wherein $(R_9)_{0-4}$ denotes from 0 to 4 identical or different substituents from the group halogen, nitro, cyano, trifluoromethyl, sulfamoyl, carbamoyl, $C_1$–$C_4$alkyl, $C_1$–$C_4$alkoxy, amino, acetylamino, ureido, hydroxy, carboxy, sulfomethyl and sulfo,

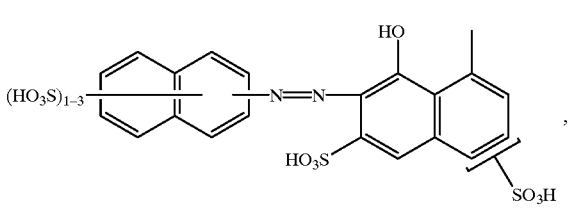
(7f)

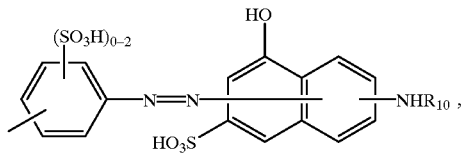
(7g)

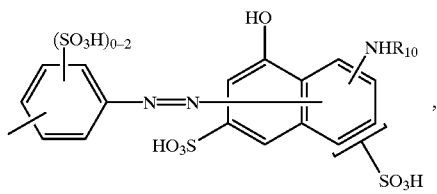
(7h)

in which formulae $R_{10}$ is hydrogen, $C_1$–$C_4$alkanoyl, benzoyl or a halotriazinyl radical of the above-indicated formula (6g),

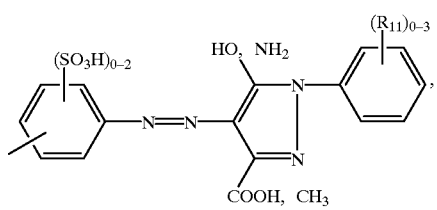
(7i)

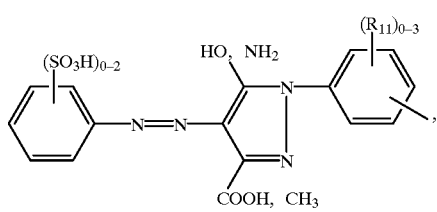
(7j)

in which formulae $(R_{11})_{0-3}$ denotes from 0 to 3 identical or different substituents from the group $C_1$–$C_4$alkyl, $C_1$–$C_4$alkoxy, halogen, carboxy and sulfo,

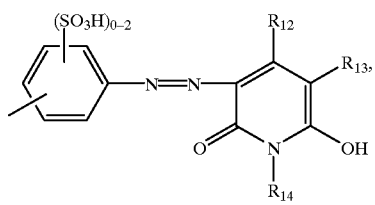
(7k)

wherein $R_{12}$ and $R_{14}$ are each independently of the other hydrogen, $C_1$–$C_4$alkyl or phenyl and $R_{13}$ is hydrogen, cyano, carbamoyl or sulfomethyl,

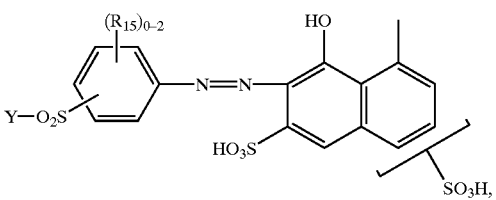
(7l)

wherein $(R_{15})_{0-2}$ denotes from 0 to 2 identical or different substituents from the group $C_1$–$C_4$alkyl, $C_1$–$C_4$alkoxy, halogen, carboxy and sulfo; and Y is as defined hereinabove,

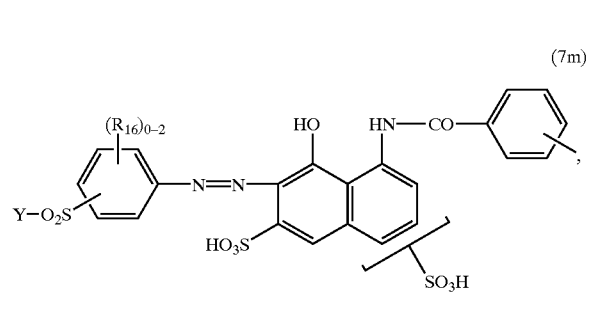
(7m)

wherein $(R_{16})_{0-2}$ denotes from 0 to 2 identical or different substituents from the group $C_1$–$C_4$alkyl, $C_1$–$C_4$alkoxy, halogen, carboxy and sulfo, and Y has the definitions given hereinabove,

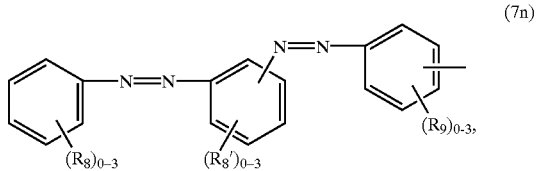
(7n)

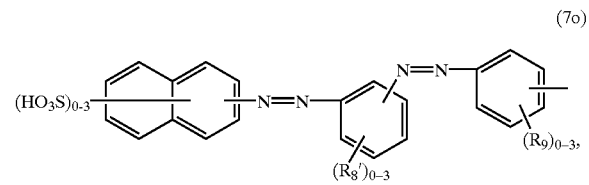
(7o)

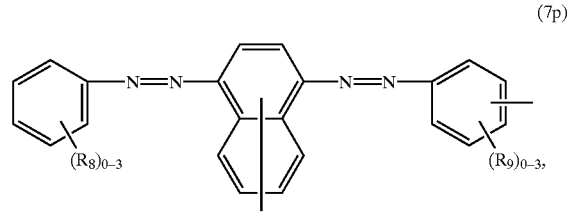
(7p)

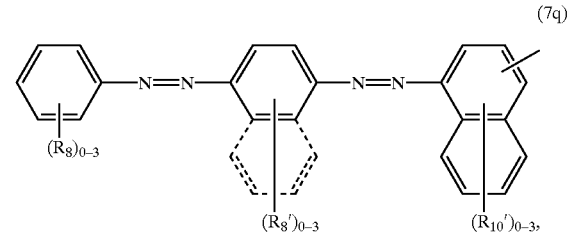
(7q)

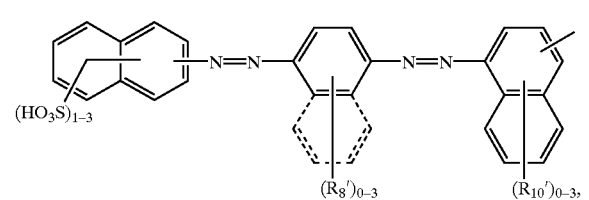
(7r)

-continued (7s)

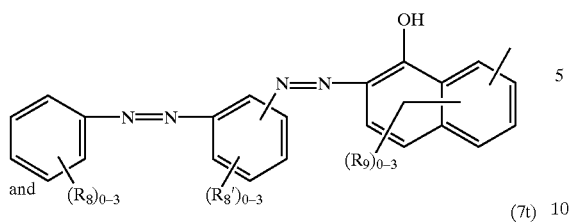

and $(R_8)_{0-3}$  $(R_8')_{0-3}$  $(R_9)_{0-3}$ (7t)

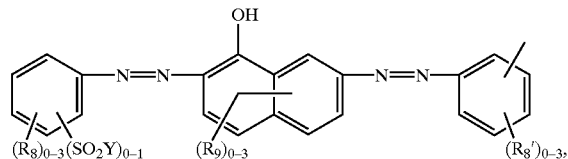

$(R_8)_{0-3}(SO_2Y)_{0-1}$  $(R_9)_{0-3}$  $(R_8')_{0-3}$, in which formulae $(R_8)_{0-3}$ denotes from 0 to 3 identical or different substituents from the group $C_1$–$C_4$alkyl, $C_1$–$C_4$alkoxy, halogen, carboxy and sulfo, $(R_8')_{0-3}$ denotes from 0 to 3 identical or different substituents from the group $C_1$–$C_4$alkyl, $C_1$–$C_4$alkoxy, acetylamino, halogen, carboxy, sulfo, $C_1$–$C_4$hydroxyalkoxy and $C_1$–$C_4$sulfatoalkoxy, $(R_9)_{0-3}$ denotes from 0 to 3 identical or different substituents from the group halogen, nitro, cyano, trifluoromethyl, sulfamoyl, carbamoyl, $C_1$–$C_4$alkyl, $C_1$–$C_4$alkoxy, amino, acetylamino, ureido, hydroxy, carboxy, sulfomethyl and sulfo, $(R_{10}')_{0-3}$ denotes from 0 to 3 identical or different substituents from the group $C_1$–$C_4$alkyl, $C_1$–$C_4$alkoxy, halogen, carboxy and sulfo, and Y is as defined hereinabove.

The radicals of formulae (7a) to (7s) may carry in the phenyl or naphthyl rings, as a further substituent, also a radical of formula —$SO_2Y$, wherein Y is as defined hereinabove. Preferably they do not contain a radical of formula —$SO_2Y$.

The radical of a formazan dye A is preferably a dye radical of formula (8a)

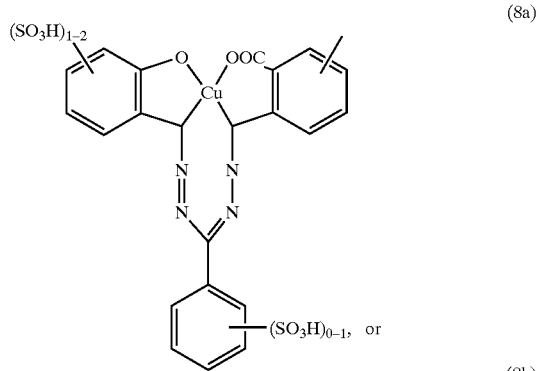

$(SO_3H)_{1-2}$ $(SO_3H)_{0-1}$, or (8b)

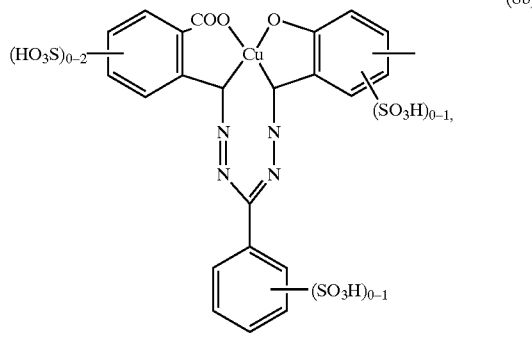

$(HO_3S)_{0-2}$ $(SO_3H)_{0-1}$ $(SO_3H)_{0-1}$ wherein the benzene nuclei do not contain any further substituents or are further substituted by $C_1$–$C_4$alkyl, $C_1$–$C_4$alkoxy, $C_1$–$C_4$alkylsulfonyl, halogen or carboxy.

As a radical of a phthalocyanine dye, A is preferably a radical of formula:

(9)

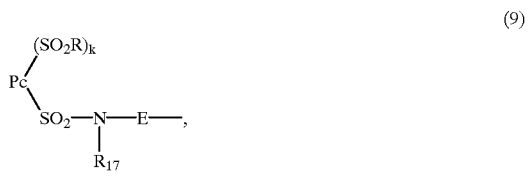

wherein Pc is the radical of a metal phthalocyanine, especially the radical of a copper or nickel phthalocyanine; R is —OH and/or —$NR_{18}R_{19}$; $R_{18}$ and $R_{19}$ are each independently of the other hydrogen or unsubstituted or hydroxy- or sulfo-substituted $C_1$–$C_4$alkyl; $R_{17}$ is hydrogen or $C_1$–$C_4$alkyl; E is a phenylene radical unsubstituted or substituted by $C_1$–$C_4$alkyl, halogen, carboxy or by sulfo or is a $C_2$–$C_6$alkylene radical; and k is from 1 to 3. $R_{18}$ and $R_{19}$ are preferably hydrogen. E is preferably a phenylene radical unsubstituted or substituted by $C_1$–$C_4$alkyl, halogen, carboxy or by sulfo. Pc is preferably the radical of a copper phthalocyanine.

As a radical of a dioxazine dye, A is, for example, a radical of formula:

(10)

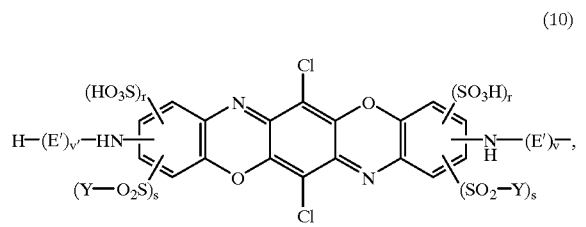

wherein E' is a phenylene radical unsubstituted or substituted by $C_1$–$C_4$alkyl, halogen, carboxy or by sulfo or is a $C_2$–$C_6$alkylene radical, r, s, v and v' are each independently of the others the number 0 or 1 and Y is as defined hereinabove. Preferably, E' is $C_2$–$C_4$alkylene or unsubstituted or sulfo-substituted 1,3- or 1,4-phenylene, r is the number 1, s is the number 0, v is the number 1 and v' is the number 0 or 1.

As a radical of an anthraquinone dye, A is preferably a radical of formula:

(11)

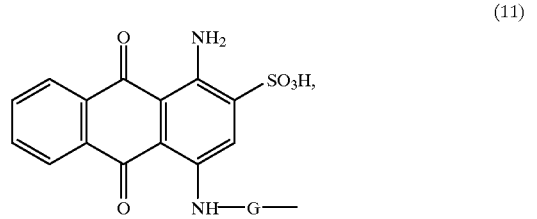

wherein G is a phenylene radical unsubstituted or substituted by $C_1$–$C_4$alkyl, $C_1$–$C_4$alkoxy, halogen, carboxy or by sulfo, or is a cyclohexylene, phenylenemethylene or $C_2$–$C_6$alkylene radical, each of which preferably contains at least 2 sulfo groups. G is preferably a phenylene radical unsubstituted or substituted by $C_1$–$C_4$alkyl, $C_1$–$C_4$alkoxy, halogen, carboxy or by sulfo.

A is especially a monoazo or disazo chromophore radical of the above-indicated formula (7a), (7b), (7d), (7e), (7f), (7k), (7o), (7q) or (7t), a formazan radical of the above-indicated formula (8b), or an anthraquinone radical of the above-indicated formula (11).

In the meanings given for the variables, $C_1$–$C_4$alkyl is generally methyl, ethyl, n- or iso-propyl or n-, iso-, sec- or tert-butyl. $C_1$–$C_4$Alkoxy is generally methoxy, ethoxy, n- or iso-propoxy or n-, iso-, sec- or tert-butoxy. Halogen is generally, e.g., fluorine, chlorine or bromine. Examples of $C_1$–$C_4$alkoxycarbonyl are methoxycarbonyl and ethoxycarbonyl. Examples of $C_1$–$C_4$alkanoyl are acetyl, propionyl and butyryl. Examples of $C_2$–$C_4$alkanoylamino are acetylamino and propionylamino. Examples of $C_1$–$C_4$hydroxyalkoxy are hydroxymethoxy, β-hydroxyethoxy and β- and γ-hydroxypropoxy. Examples of $C_1$–$C_4$sulfatoalkoxy are sulfatomethoxy, β-sulfatoethoxy and β- and γ-sulfatopropoxy.

The reactive dyes of formula (1) contain at least one, preferably at least two and especially from 2 to 8, sulfo groups, each of which is either in the form of its free acid or preferably a salt thereof. As salts there come into consideration, for example, the alkali metal, alkaline earth metal and ammonium salts, salts of an organic amine and mixtures thereof. As examples there may be mentioned sodium, lithium, potassium and ammonium salts, the salt of mono-, di- or tri-ethanolamine and Na/Li and Na/Li/$NH_4$ mixed salts.

The reactive dyes of formula (1) can be obtained in a manner known per se, such as in the manner described, for example, in U.S. Pat. No. 5,989,297, for example as follows:

an amino compound of formula

$$A\text{—}NH\text{—}R_1 \quad (12),$$

a diamine of formula

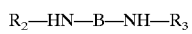

$$R_2\text{—}HN\text{—}B\text{—}NH\text{—}R_3 \quad (13),$$

a compound of formula

$$T\text{—}H \quad (14)$$

and
a compound of formula

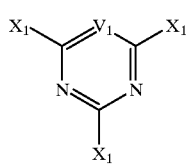

(15a)

and

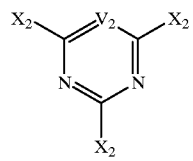

(15b)

are reacted with one another in any sequence, in which formulae B, A, $R_1$, $R_2$, $R_3$, T, $V_1$, $V_2$, $X_1$ and $X_2$ are each as defined hereinabove. One process variant comprises condensing one of the compounds of formulae (12) and (14) first of all with a compound of formula (15a) or (15b), condensing the condensation product with a diamine of formula (13) and reacting the resulting reaction product with the other compound of formula (12) or (14) which has been condensed beforehand with the compound of formula (15a) or (15b).

The condensation reactions between the compounds of formulae (12), (13), (14), (15a) and (15b) are generally carried out analogously to known procedures, usually in aqueous solution at temperatures of, for example, from 0 to 50° C. and a pH value of, for example, from 4 to 10. The compounds of formulae (12), (13) and (14), as well as the heterocyclic halogen compounds of formulae (15a) and (15b), are known or can be prepared analogously to known compounds.

The end product may optionally in addition be subjected to a conversion reaction. Such a conversion reaction is, for example, the conversion of a vinylatable reactive group present in T into its vinyl form by treatment with dilute sodium hydroxide solution, for example the conversion of the β-sulfatoethylsulfonyl or β-chloroethylsulfonyl group into the vinylsulfonyl radical. Such reactions are known per se.

In the method according to the invention there are used for the printing, for example, pastes, that is to say aqueous solutions thickened and adjusted to the desired consistency by a thickener.

There may be used as thickeners the customary thickeners of natural or synthetic origin suitable for reactive printing, e.g. alginate thickeners, starch ethers or locust bean flour ethers, cellulose derivatives, e.g. cellulose ethers, such as methylcellulose, ethylcellulose, hydroxyethylcellulose, methylhydroxyethylcellulose, hydroxypropyl cellulose, hydroxypropyl methylcellulose, carboxymethylcellulose, carboxyethylcellulose or cyanoethylcellulose, or a cellulose ester, e.g. acetylcellulose. Preference is given to the use in the print pastes of sodium alginate alone or in admixture with modified cellulose, especially with preferably from 20 to 25% by weight carboxymethylcellulose.

The amount of thickener in the print paste can vary within wide limits according to the desired viscosity. Preferably, the amount of thickener present in the print paste is from 5 to 100 g/kg of print paste, especially from 10 to 80 g/kg of print paste, more especially from 10 to 60 g/kg of print paste.

The viscosity of the print paste is generally from 1000 to 20 000 mPa s. Preference is given to the use of print pastes having a viscosity of from 2500 to 15 000 mPa s, especially from 4000 to 6000 mPa s.

The print pastes may comprise fixing alkalis for the purpose of fixing the reactive dyes. As compounds having an alkaline reaction there are used, for example, sodium carbonate, sodium hydroxide, disodium phosphate, trisodium phosphate, sodium acetate, sodium propionate, sodium hydrogen carbonate, borax, aqueous ammonia or alkali donors, e.g. sodium chloroacetate or sodium formate. It is also possible to use as fixing alkali a mixture of water glass and a 25% aqueous sodium carbonate solution. The pH value of the additives comprising fixing alkali is generally from 7.5 to 13.2, preferably from 8.5 to 12.5. For the preparation of the print paste, the amount of fixing alkali is so selected that the pH value of the ready-to-use print paste is generally in the alkaline range, preferably in the range from 7.5 to 12.

Print pastes that do not comprise fixing alkali can be applied according to the so-called two-phase printing method, in which the fibre material is first printed with a print paste without alkali or alkali donor, and the printed fibre material is dried and then treated with an optionally thickened aqueous liquor comprising the fixing alkali. Alternatively, the fibre material to be printed can first be treated with an aqueous alkali liquor and then the treated and optionally dried fibre material printed with a print paste that does not comprise alkali or alkali donor.

The print paste may also comprise, in addition to the reactive dyes and thickeners, further customary additives, e.g. preservatives, sequestering agents, emulsifiers, water-insoluble solvents, oxidising agents, reduction inhibitors, antifoams or de-aerators.

There come into consideration as preservatives especially formaldehyde-yielding agents, e.g. paraformaldehyde and trioxane, especially aqueous, for example 30 to 40% by weight, formaldehyde solutions; as sequestering agents, for example, nitrilotriacetic acid sodium salt, ethylenediaminetetraacetic acid sodium salt, especially sodium polymetaphosphate, more especially sodium hexametaphosphate; as emulsifiers especially adducts of an alkylene oxide and a fatty alcohol, more especially an adduct of oleyl alcohol and ethylene oxide; as water-insoluble solvents high-boiling, saturated hydrocarbons, especially paraffins having a boiling range of approximately from 160 to 210° C. (so-called white spirits); and as oxidising agents, for example, an aromatic nitro compound, especially an aromatic mono- or di-nitro-carboxylic acid or -sulfonic acid, which is optionally present in the form of an alkylene oxide adduct, especially a nitrobenzenesulfonic acid.

As reduction inhibitors there come into consideration, for example, aromatic nitro compounds, especially salts of aromatic mono- or di-nitro-carboxylic acids or -sulfonic acids, which are optionally in the form of alkylene oxides, especially alkali metal salts of a nitro-benzenesulfonic acid, e.g. 4-nitrobenzenesulfonic acid sodium salt. The reduction inhibitor is preferably used in an amount of from 0.1 to 4% by weight, especially from 0.8 to 2% by weight, based on the total weight of the finished print paste.

There may be used as de-aerator any commercially available de-aerator provided that it does not adversely affect the rheological properties of the print paste. Preference is given, on account of their good anti-foaming properties, to low-silicone oil or silicone oil-free de-aerators, which generally contain from 0 to 5% by weight of a conventional silicone oil. Of prime interest are de-aerators that comprise as active substance a higher alcohol, such as 2-ethyl-n-hexanol or 2-hexyldecanol, or a mixture thereof with high-boiling hydrocarbon mixtures, and that comprise silicone oils in the amount indicated above. The print paste comprises the de-aerator in an amount of, for example, from 0 to 5% by weight, preferably from 0.1 to 1% by weight, based on the total weight of the finished print paste.

The print pastes may comprise as further additives solubilisers, such as urea, $\epsilon$-caprolactam, ethylene glycol, diethylene glycol, thiodiethylene glycol, polyethylene glycol, pentaerythritol, acetin (mixture of glycol mono-, di- and tri-acetate) or dicyandiamide.

When printing on fibre materials, the print paste is applied directly to the fibre material over the entire surface or over parts thereof, the printing machines used advantageously being of customary construction, e.g. gravure printing machines, rotary screen printing machines and flat screen printing machines. The method according to the invention is used especially advantageously in screen printing.

As cellulosic fibre materials there come into consideration materials that consist wholly or partially of cellulose. Examples include natural fibre materials, such as cotton, linen and hemp, regenerated fibre materials, e.g. viscose, polynosic and cuprammonium silk, and cellulosic blends, e.g. cotton/polyester materials. Mainly, woven fabrics, knitted fabrics or webs of such fibres are used.

The fibre material is advantageously dried after the printing procedure, preferably at temperatures of up to 180° C., especially from 125 to 150° C. A fixing process step customarily carried out subsequent thereto in order to complete the printing and fix the dye, such as steaming of the printed and dried fabric, is not necessary in the method according to the invention. After the printing procedure, the fibre material is preferably dried for from 30 to 120 seconds at from 125 to 150° C., especially from 140 to 150° C.

The printed and dried fibre material is washed off in conventional manner in order to remove unfixed dye. For that purpose the fibre material is treated, for example, at from 40° C. to boiling temperature with water to which a soap or a synthetic detergent may optionally be added.

The prints on cellulosic fibre materials obtainable according to the method of the invention exhibit good allround properties; for example they have a high fibre-dye binding stability in both the acidic and the alkaline range, especially the acidic range, a good fastness to light, good wet-fastness properties, such as fastness to washing, to water, to sea water, to cross-dyeing and to perspiration, a good fastness to chlorine, fastness to rubbing, fastness to ironing and fastness to pleating, and are distinguished especially by sharp contours, a high tinctorial strength and brilliant colour shades. The degree of fixing is high and unfixed dye can readily be washed off, that is to say the soaping loss is very small.

Some of the reactive dyes of formula (1) are novel. The present invention accordingly relates also to reactive dyes of formula (1) indicated hereinabove wherein B is $C_2$–$C_{12}$alkylene that may be interrupted by 1, 2 or 3 members from the group —NH—, —N(CH$_3$)— and —O— and that is unsubstituted or substituted by hydroxy, sulfo, sulfato, cyano or by carboxy, and A, $R_1$, $R_2$, $R_3$, $X_1$, $X_2$, T, $V_1$ and $V_2$ have the definitions and preferred meanings given hereinabove, with the exception of the dyes of formulae:

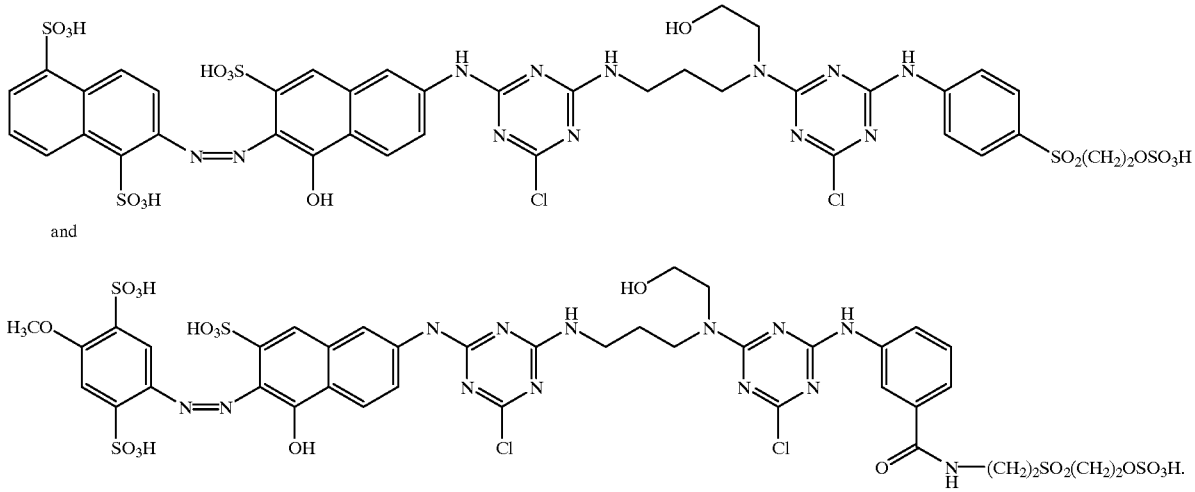

and

As bridging member B in the reactive dyes according to the invention, preference is given to a $C_2$–$C_{12}$alkylene radical that may be interrupted by 1, 2 or 3 members —O— and that is unsubstituted or substituted by hydroxy, sulfo, sulfato, cyano or carboxy.

As bridging member B in the reactive dyes according to the invention, preference is given especially to a $C_2$–$C_{12}$alkylene radical, especially a $C_2$–$C_6$alkylene radical, e.g. 1,2-ethylene, 1,3-propylene, 1,2-propylene, 1,4-butylene, 1,3-butylene, 1,5-pentylene, 3,5-pentylene, 1,6-hexylene, 2,5-hexylene, 4,6-hexylene or a radical of formula

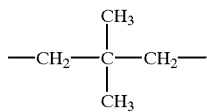

or

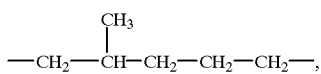

which may be interrupted by 1, 2 or 3 members —O— and is unsubstituted or substituted by hydroxy or sulfato, but is preferably not interrupted by —O—.

As bridging member B in the reactive dyes according to the invention, preference is given more especially to bridging members of formula —$CH_2$—$CH(R_7)$— or —$(R_7)CH$—$CH_2$—, wherein $R_7$ is $C_1$–$C_4$alkyl, especially methyl, and very especially to 1,2-propylene.

The novel reactive dyes can be obtained in a manner known per se, for example according to the process described above.

The present invention relates also to print pastes that comprise the reactive dyes of formula (1) according to the invention. The print pastes may also comprise, in addition to the reactive dyes according to the invention, to water and to a thickener, further additives, e.g. the additives described hereinabove. As thickeners there come into consideration, e.g., the thickeners described hereinabove.

The following Examples serve to illustrate the invention. Unless otherwise indicated, the temperatures are given in degrees Celsius, parts are parts by weight and percentages relate to percent by weight. Parts by weight relate to parts by volume in a ratio of kilograms to liters.

Preparation Examples 1 to 94

EXAMPLE 1 a) 25.3 parts of 4-(β-sulfatoethylsulfonyl)aniline are dissolved in 200 parts of water at pH 5 by adding sodium hydroxide. The solution is buffered with 0.5 part of sodium tripolyphosphate and 150 parts of ice are added. 12.2 parts of trifluorotriazine are added dropwise, with stirring, over a period of from 5 to 10 minutes to that mixture, in the course of which the pH is maintained at 5.5 by the addition of an aqueous sodium hydroxide solution and the temperature is maintained at from 0 to 2° C. 420 parts of a suspension are obtained.

b) 9.7 parts of trichlorotriazine are dispersed in an ice/water mixture at 0° C. with the addition of a wetting agent. Over a period of one hour, a neutral solution of 27.3 parts of the aminoazo compound of formula:

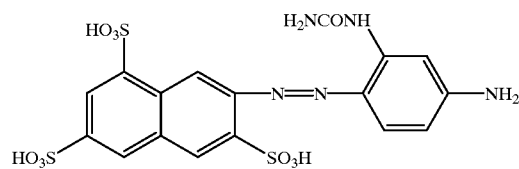

in 200 parts of water is added dropwise to the resulting solution at from 0 to 2° C. and pH 4.5, and stirring is carried out for a further hour at 5° C. To the solution obtained there is added dropwise over a period of 20 minutes, at pH 5.5, a solution of 4.8 parts of 1,2-propylenediamine in 100 parts of water neutralised with 12.5 parts of concentrated hydrochloric acid. Stirring is then carried out for several hours at from 35 to 45° C. and pH 5.5.

c) The suspension obtained according to b) is adjusted to pH 7.5 to 8 and added over a period of 30 minutes at pH 7.5 to the suspension obtained in accordance with a). To complete the reaction, one hour is allowed for the reactants to react fully. The pH of the resulting reaction mixture is then adjusted to 10.5 and stirring is carried out for 30 minutes. The reaction solution is freed of inorganic salts by dialysis and concentrated by evaporation to yield 86.5 parts of a dye which, in the form of the free acid, corresponds to formula:

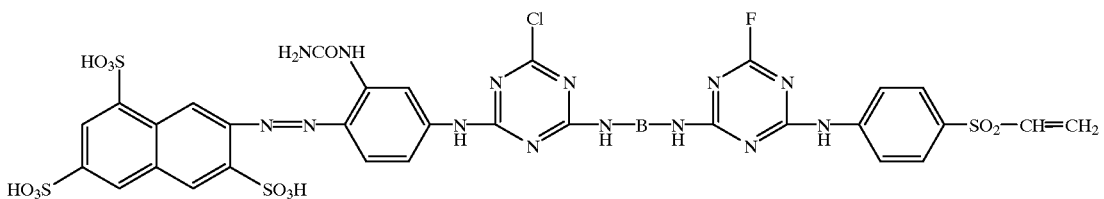

(101)

wherein B is the radical of formula

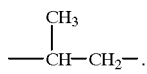

The dye yields prints on cellulose in a yellow shade having good allround properties.

EXAMPLE 2 a) 11 parts of cyanuric chloride are stirred at a temperature of approximately 0° C. in 50 parts of water with the addition of a wetting agent and 5 parts of disodium hydrogen phosphate. A neutral solution of 40 parts of the aminoazo compound of formula:

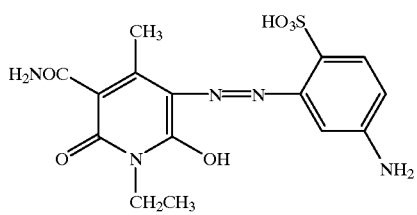

in 400 parts of water is added dropwise, in the course of which the pH value is maintained at 4.5 by the addition of aqueous sodium hydroxide solution. When the condensation is complete, the primary condensation product of cyanuric chloride and the aminoazo compound is obtained.

b) 14 parts of cyanuric fluoride are added dropwise at a temperature of from 0 to 2° C. to a neutral solution of 26 parts of 4-(β-sulfatoethylsulfonyl)aniline and 5 parts of disodium hydrogen phosphate in 170 parts of water and the pH value is kept constant by the addition of aqueous sodium hydroxide solution. A neutral solution of 7.4 parts of 1,2-diaminopropane in 30 parts of water is so added dropwise to the resulting solution of the condensation product of cyanuric fluoride and 4-(β-sulfatoethylsulfonyl)aniline that the pH value does not exceed 6. That pH value is maintained until the condensation is complete by the addition of aqueous sodium hydroxide solution, and towards the end of the reaction the reaction solution is heated to 40° C.

c) The reaction mixture obtained in accordance with a) is added to the reaction mixture obtained in accordance with b) and the pH value is increased to 8.5, where it is maintained until the condensation is complete by the addition of aqueous sodium hydroxide solution. The reaction solution is freed of inorganic salts by dialysis and concentrated by evaporation to yield a dye which, in the form of the free acid, corresponds to formula

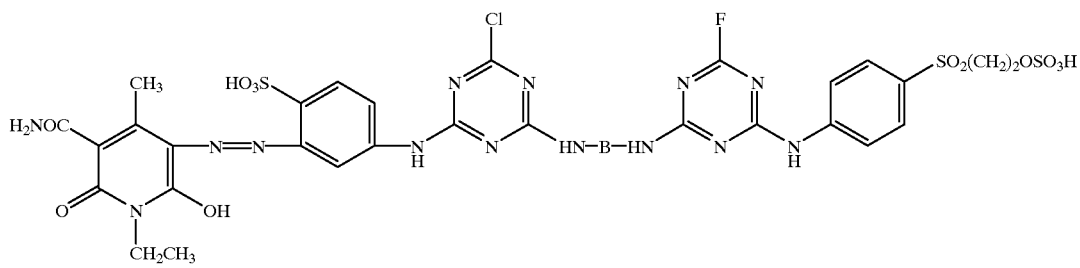

(102)

wherein B is the radical of formula

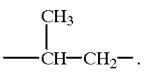

The dye yields prints on cellulose in a brilliant yellow shade having good allround properties.

EXAMPLE 3 a) 14 parts of cyanuric fluoride are added dropwise at a temperature of from 0 to 2° C. to a neutral solution of 40 parts of the aminoazo compound specified in Example 2 a) and 5 parts of disodium hydrogen phosphate in 400 parts of water, and the pH value is kept constant by the addition of aqueous sodium hydroxide solution. When condensation is complete, the primary condensation product of cyanuric fluoride and the aminoazo compound is obtained.

b) The reaction mixture obtained in accordance with a) is added to the reaction mixture obtained in accordance with Example 2 b) and the pH is increased to a value of 8.5, where it is maintained until the condensation is complete by the addition of aqueous sodium hydroxide solution. The reaction solution is freed of inorganic salts by dialysis and concentrated by evaporation to yield a dye which, in the form of the free acid, corresponds to formula:

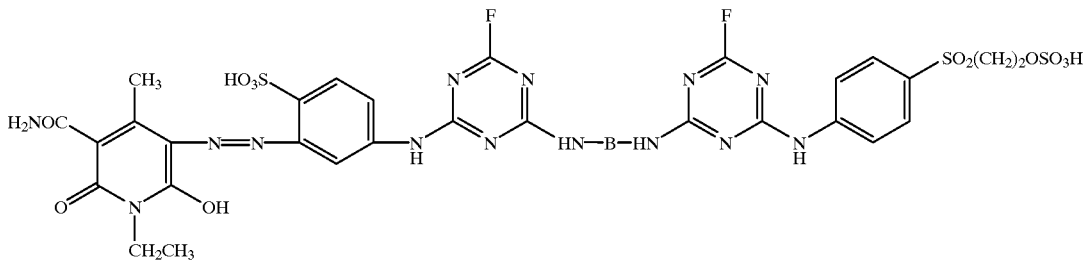

wherein B is the radical of formula

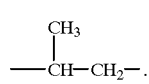

The dye yields prints on cellulose in a brilliant yellow shade having good allround properties.

EXAMPLES 4 TO 28

Proceeding analogously to one of the procedures described in Examples 1 to 3, it is possible to obtain the reactive dyes of formula:

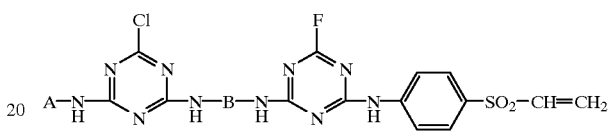

wherein A and B each have the definitions given in Table 1. The dyes yield prints on cellulose in the colour shades indicated having good allround properties.

TABLE 1

| Example | A | B | Shade |
|---|---|---|---|
| 4 | 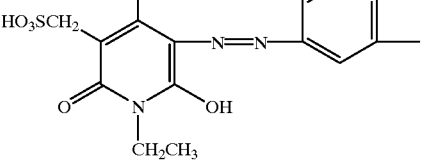 | 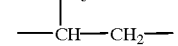 | yellow |
| 5 | 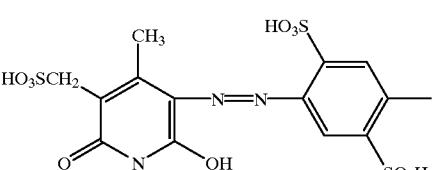 |  | yellow |
| 6 | 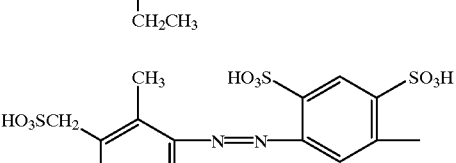 |  | yellow |
| 7 | 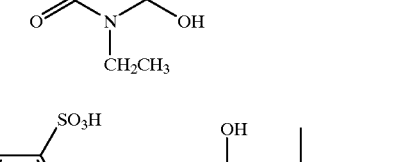 |  | red |

TABLE 1-continued

| Example | A | B | Shade |
|---|---|---|---|
| 8 | (structure: 4-methoxy-2-sulfophenyl azo coupled to 1-hydroxy-6-methyl-naphthalene with SO₃H groups) | —CH(CH₃)—CH₂— | scarlet |
| 9 | (structure: 1-sulfo-naphth-2-yl azo coupled to 1-hydroxy-8-methyl-naphthalene-3,6-disulfonic acid) | —CH(CH₃)—CH₂— | red |
| 10 | (structure: 1,5-disulfo-naphth-2-yl azo coupled to 1-hydroxy-8-methyl-naphthalene-3,6-disulfonic acid) | —CH(CH₃)—CH₂— | red |
| 11 | (structure: 1,5-disulfo-naphth-3-yl azo coupled to 2-acetamido-4-methylphenyl) | —CH(CH₃)—CH₂— | yellow |
| 12 | (structure: 2,5-disulfophenyl azo — naphthyl(SO₃H) — azo — 4-methyl-naphthyl-SO₃H) | —CH(CH₃)—CH₂— | brown |
| 13 | (structure: 1,3,6-trisulfonaphth-7-yl azo — phenyl — azo — 4-methylphenyl) | —CH(CH₃)—CH₂— | yellow |
| 14 | (structure: 2-amino-1-(2-sulfo-4-methylphenylazo)-8-hydroxy-naphthalene-3,6-disulfonic acid) | —CH(CH₃)—CH₂— | red |

TABLE 1-continued
| Example | A | B | Shade |
|---|---|---|---|
| 15 | 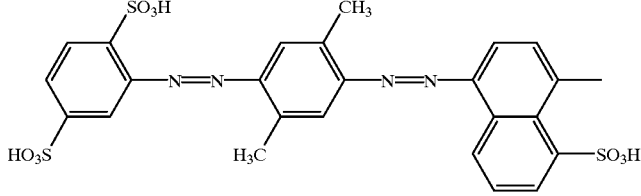 | 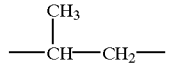 | orange |
| 16 | 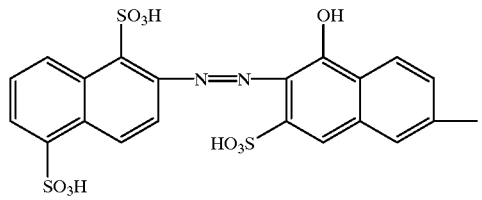 | 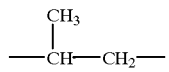 | orange |
| 17 | 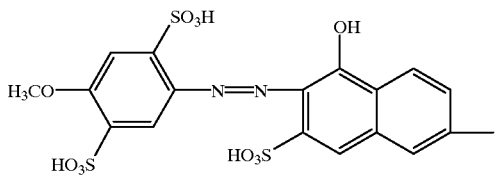 | 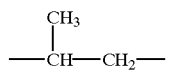 | scarlet |
| 18 | 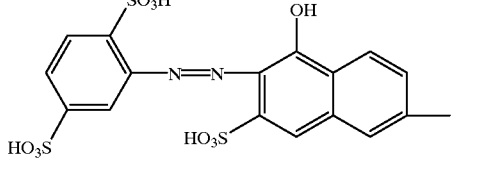 | 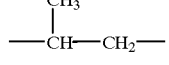 | orange |
| 19 | 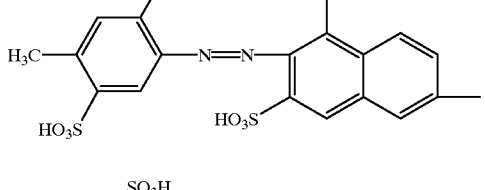 | 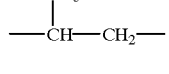 | orange |
| 20 | 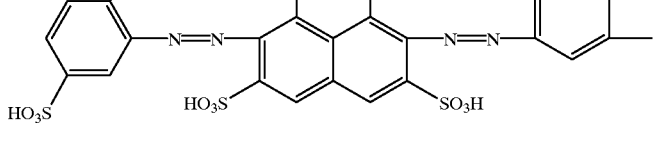 | 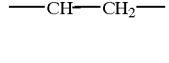 | navy |
| 21 | 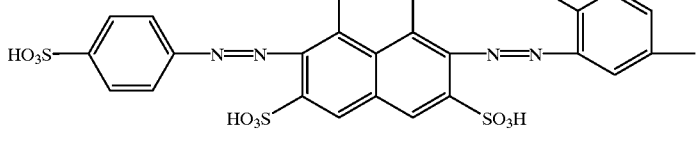 | 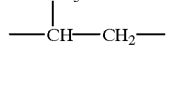 | navy |
| 22 | 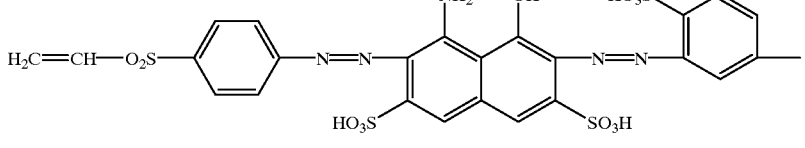 | 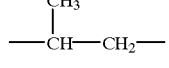 | navy |

TABLE 1-continued

| Example | A | B | Shade |
|---|---|---|---|
| 23 | 1-amino-4-(2,3,5,6-tetramethyl-4-sulfoanilino)anthraquinone-2-sulfonic acid | $CH_3-CH(-)-CH_2-$ | blue |
| 24 | 4-methoxy-2-sulfophenylazo-1-hydroxy-6-methyl-3-sulfonaphthalene | $CH_3-CH(-)-CH_2-$ | scarlet |
| 25 | 4-sulfophenylazo-2-sulfophenylazo-1-hydroxy-6-methyl-3,5-disulfonaphthalene | $CH_3-CH(-)-CH_2-$ | scarlet |
| 26 | 2,5-disulfophenylazo-(5-methoxy-2-acetamido)phenylazo-1-hydroxy-8-methyl-3,6-disulfonaphthalene | $CH_3-CH(-)-CH_2-$ | blue |
| 27 | 2,5-disulfophenylazo-(5-(2-hydroxyethoxy)-2-methyl)phenylazo-1-hydroxy-8-methyl-3,6-disulfonaphthalene | $CH_3-CH(-)-CH_2-$ | blue |
| 28 | [2-hydroxy-5-nitrophenylazo-1-hydroxy-8-methyl-3,6-disulfonaphthalene]₂ Cr  1:2 Cr complex | $CH_3-CH(-)-CH_2-$ | grey |

EXAMPLES 29 TO 33

Proceeding analogously to one of the procedures described in Examples 1 to 3, it is possible to obtain the reactive dyes of formula:

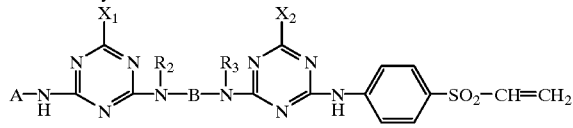

wherein A, $X_1$, $X_2$ and

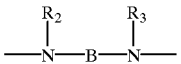

each have the definitions given in Table 2. The dyes yield prints on cellulose in the colour shades indicated having good allround properties.

TABLE 2

| Example | A | $X_1$/$X_2$ | $-\overset{R_2}{N}-B-\overset{R_3}{N}-$ | Shade |
|---|---|---|---|---|
| 29 | Cu-complex azo structure (2-hydroxybenzaldehyde-derived, with $HO_3S$ and $SO_3H$ substituents, phenyl) | F/F | $-\underset{H}{N}-(CH_2)_2-N-$ with $(CH_2)_2OH$ | blue |
| 30 | Bis-azo structure with $SO_3H$, $HO_3S$, $CH_3$, $H_3C$ substituents and naphthyl-$SO_3H$ | Cl/F | $-\underset{H}{N}-(CH_2)_2-N-$ with $(CH_2)_2OH$ | orange |
| 31 | Naphthalene-trisulfonic acid bis-azo with phenyl-phenyl-methyl | Cl/F | $-\underset{H}{N}-(CH_2)_2-N-$ with $(CH_2)_2OH$ | yellow |
| 32 | Cu-complex azo structure (with $HO_3S$, $SO_3H$, phenyl) | F/F | $-\underset{H}{N}-\underset{\overset{|}{CH_3}}{CH}-CH_2-\underset{H}{N}-$ | blue |

TABLE 2-continued

| Example | A | X₁/X₂ | —N(R₂)—B—N(R₃)— | Shade |
|---|---|---|---|---|
| 33 | 3-(acetylamino)-4-methylphenyl azo coupled to 1,5-naphthalenedisulfonic acid (SO₃H at 1,5; H₃COCNH and CH₃ on aniline ring) | Cl/Cl | —NH—CH(CH₃)—CH₂—NH— | yellow |

EXAMPLES 34 TO 60

Proceeding analogously to the procedure described in Example 1, but using instead of 25.3 parts of 4-(β-sulfatoethylsulfonyl)aniline an equimolar amount of one of the amines of formula $D_{xy}$-NH₂ set out in Table 3, reactive dyes of the general formula:

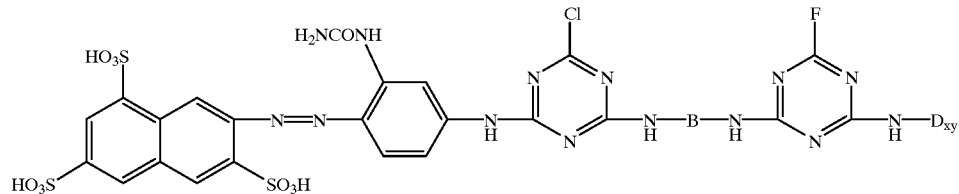

obtained wherein B is the radical of formula

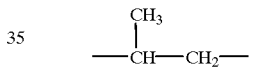

and $D_{xy}$ has the definition of the radical given in each case in Table 3. The dyes yield prints on cellulose in a yellow shade having good allround properties.

TABLE 3

| Example | Amine $D_{xy}$—NH₂ | $D_{xy}$ |
|---|---|---|
| 34 | $D_{10}$—NH₂ | $D_{10}$ = —C₆H₄—SO₂—CH₂—CH₂—OSO₃H (meta) |
| 35 | $D_{11}$—NH₂ | $D_{11}$ = HO₃S-substituted phenyl —SO₂—CH₂—CH₂—OSO₃H |
| 36 | $D_{12}$—NH₂ | $D_{12}$ = HO₃S-substituted phenyl —HN—C(O)—CH(Br)—CH₂Br |

TABLE 3-continued

| Example | Amine $D_{xy}-NH_2$ | $D_{xy}$ |
|---|---|---|

37 — $D_{13}-NH_2$ — $D_{13}$ = 4-methyl-2,5-disulfo-phenyl with $-NH-CO-CHBr-CH_2Br$ substituent (sulfo groups at positions shown: HO$_3$S- and -SO$_3$H)

38 — $D_{14}-NH_2$ — $D_{14}$ = phenyl substituted with HO$_3$S-, -SO$_3$H, methyl, and $-NH-CO-CHBr-CH_2Br$ 39 — $D_{15}-NH_2$ — $D_{15}$ = 4-methyl-3-sulfo-phenyl with $-NH-CO-CHBr-CH_2Br$ substituent 40 — $D_{16}-NH_2$ — $D_{16}$ = 4-methylphenyl-CONH-(CH$_2$)$_2$-SO$_2$-(CH$_2$)$_2$-Cl 41 — $D_{17}-NH_2$ — $D_{17}$ = 3-methylphenyl-CONH-(CH$_2$)$_2$-SO$_2$-(CH$_2$)$_2$-OSO$_3$H 42 — $D_{18}-NH_2$ — $D_{18}$ = 4-methyl-3-sulfophenyl-CONH-(CH$_2$)$_2$-SO$_2$-(CH$_2$)$_2$-Cl 43 — $D_{19}-NH_2$ — $D_{19}$ = 4-methylphenyl-CONH-(CH$_2$)$_2$-SO$_2$-(CH$_2$)$_2$-OSO$_3$H 44 — $D_{20}-NH_2$ — $D_{20}$ = 4-methyl-3-sulfophenyl-CONH-(CH$_2$)$_2$-SO$_2$-(CH$_2$)$_2$-OSO$_3$H 45 — $D_{21}-NH_2$ — $D_{21}$ = 4-methylphenyl-CONH-(CH$_2$)$_3$-SO$_2$-(CH$_2$)$_2$-Cl 46 — $D_{22}-NH_2$ — $D_{22}$ = 4-methylphenyl-CONH-(CH$_2$)$_4$-SO$_2$-(CH$_2$)$_2$-Cl TABLE 3-continued
| Example | Amine $D_{xy}-NH_2$ | $D_{xy}$ |
|---|---|---|
| 47 | $D_{23}-NH_2$ | $D_{23}$ = 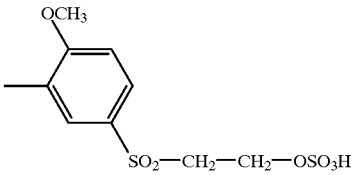 |
| 48 | $D_{24}-NH_2$ | $D_{24}$ = 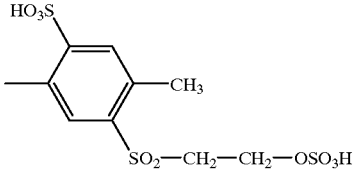 |
| 49 | $D_{25}-NH_2$ | $D_{25}$ = 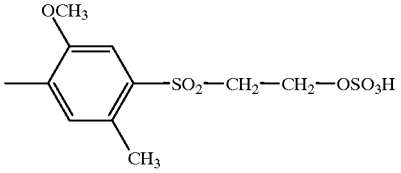 |
| 50 | $D_{26}-NH_2$ | $D_{26}$ = 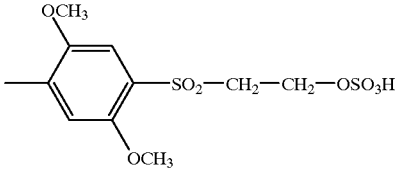 |
| 51 | $D_{27}-NH_2$ | $D_{27}$ = 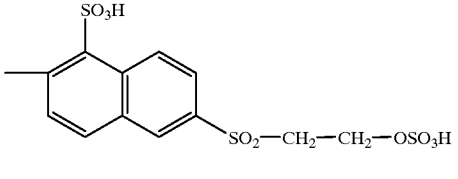 |
| 52 | $D_{28}-NH_2$ | $D_{28}$ = 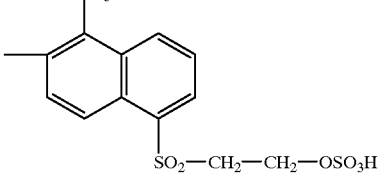 |
| 53 | $D_{29}-NH_2$ | $D_{29}$ = 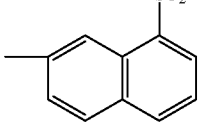 |
| 54 | $D_{30}-NH_2$ | $D_{30}$ = 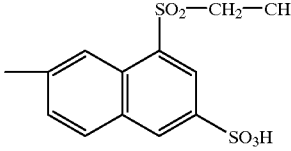 |

TABLE 3-continued

| Example | Amine $D_{xy}—NH_2$ | $D_{xy}$ |
|---|---|---|
| 55 | $D_{31}—NH_2$ | $D_{31}$ = 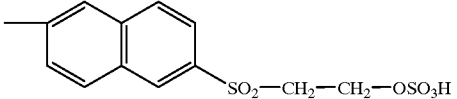 |
| 56 | $D_{32}—NH_2$ | $D_{32}$ = 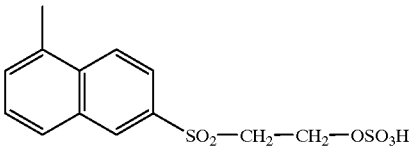 |
| 57 | $D_{33}—NH_2$ | $D_{33}$ = 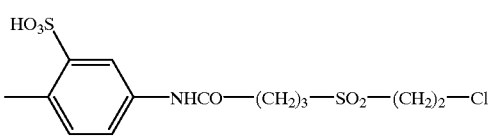 |
| 58 | $D_{34}—NH_2$ | $D_{34}$ = —NH—$(CH_2)_2$—$SO_2$—$(CH_2)_2$—Cl |
| 59 | $D_{35}—NH_2$ | $D_{35}$ = —NH—$(CH_2)_3$—$SO_2$—$(CH_2)_2$—Cl |
| 60 | $D_{36}—NH_2$ | $D_{36}$ = —NH—$(CH_2)_2$—O—$(CH_2)_2$—$SO_2$—$(CH_2)_2$—Cl |

EXAMPLES 61 TO 63

Proceeding analogously to one of the procedures described in Examples 1 to 3, it is possible to obtain the reactive dyes of the formulae indicated below wherein B is the radical of formula

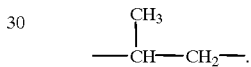

The dyes yield prints on cellulose in the colour shades indicated having good allround properties.

61
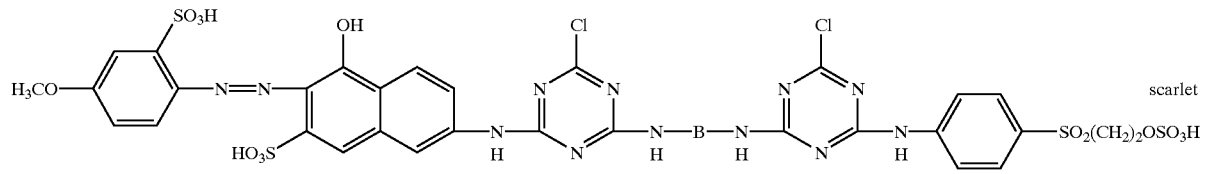
scarlet

62
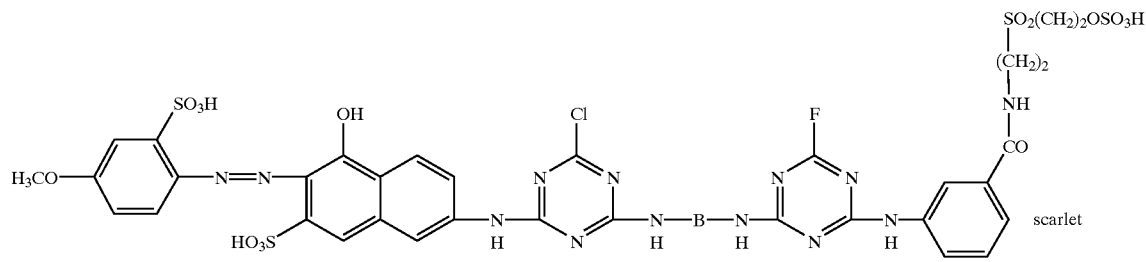
scarlet

63
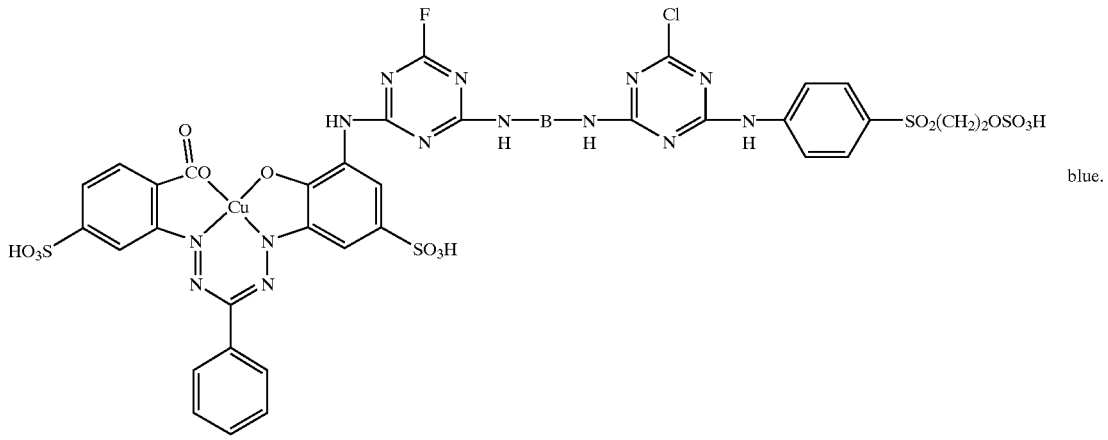
blue.
EXAMPLES 64 TO 94
Analogously to the procedure described in Examples 1 to 3, it is possible to obtain the reactive dyes of formula:
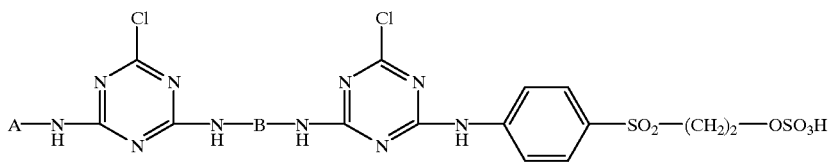
wherein A and B each have the definitions given in Table 4. The dyes yield prints on cellulose in the colour shades indicated having good allround properties.

TABLE 4

| Example | A | B | Shade |
|---|---|---|---|
| 64 | (structure: pyridone with HO₃S-tolyl azo, CH₃, HO₃SCH₂, N-CH₂CH₃, OH, =O) | —CH(CH₃)—CH₂— | yellow |
| 65 | (structure: pyridone with HO₃S-tolyl-SO₃H azo, CH₃, H₂NCO, N-CH₂CH₃, OH, =O) | —CH(CH₃)—CH₂— | yellow |
| 66 | (structure: pyrazole with NH₂, CH₃, tolyl-SO₃H azo, N-phenyl-SO₃H) | —CH(CH₃)—CH₂— | yellow |
| 67 | (structure: naphthalene with SO₃H, SO₃H, azo to tolyl-NHCOCH₃) | —CH(CH₃)—CH₂— | yellow |

TABLE 4-continued

| Example | A | B | Shade |
|---------|---|---|-------|
| 68 | [structure: 4-COOH-phenyl-N=N-linked to 1-OH, 7-methyl naphthalene with SO3H groups; pendant HO3S on phenyl] | $CH_3-CH(-)-CH_2-$ | orange |
| 69 | [structure: tolyl-N=N- linked to aminonaphthol with multiple SO3H groups; HO3S on tolyl] | $CH_3-CH(-)-CH_2-$ | red |
| 70 | [structure: H2NCONH-methylphenyl-N=N-naphthalene disulfonic acid] | $CH_3-CH(-)-CH_2-$ | yellow |
| 71 | [structure: p-tolyl-N=N-phenyl-N=N-naphthalene trisulfonic acid] | $CH_3-CH(-)-CH_2-$ | yellow |

TABLE 4-continued

| Example | A | B | Shade |
|---|---|---|---|
| 72 | ![structure: HO₃S-phenyl(SO₃H)-N=N-phenyl(CH₃,H₃C)-N=N-naphthyl(CH₃,SO₃H)] | CH₃—CH(—)—CH₂— | orange |
| 73 | ![structure: HO₃S-phenyl-N=N-phenyl(SO₃H)-N=N-phenyl(CH₃,H₂NCONH)] | CH₃—CH(—)—CH₂— | orange |
| 74 | ![structure: naphthol(SO₃H)(SO₃H)-N=N-naphthyl(OH,HO₃S,CH₃)] | CH₃—CH(—)—CH₂— | orange |
| 75 | ![structure: H₃CO-phenyl(SO₃H)-N=N-naphthyl(OH,HO₃S,CH₃,SO₃H)] | CH₃—CH(—)—CH₂— | scarlet |

TABLE 4-continued

| Example | A | B | Shade |
|---|---|---|---|
| 76 | (structure) | —CH(CH₃)—CH₂— | scarlet |
| 77 | (structure) | —CH(CH₃)—CH₂— | red |
| 78 | (structure) | —CH(CH₃)—CH₂— | red |
| 79 | (structure) | —CH(CH₃)—CH₂— | red |
| 80 | (structure) | —CH(CH₃)—CH₂— | red |

TABLE 4-continued
| Example | A | B | Shade |
|---|---|---|---|
| 81 | 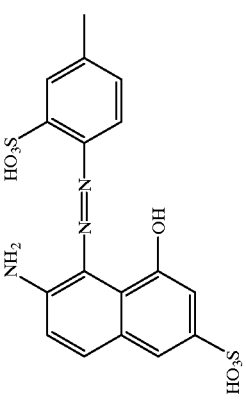 | 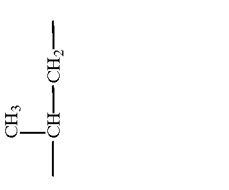 | red |
| 82 | 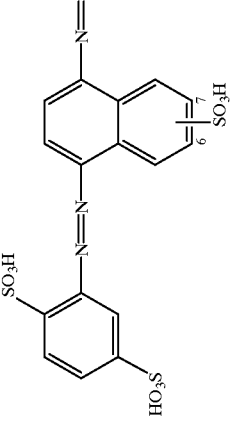 | 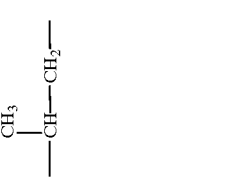 | brown |
| 83 | 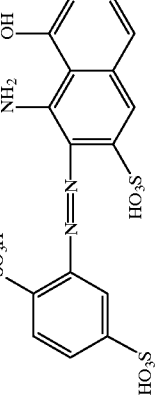 | 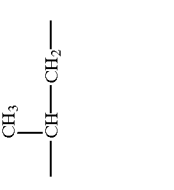 | navy |
| 84 | 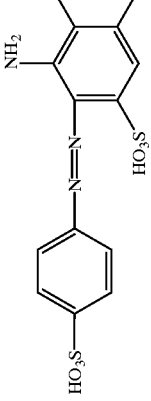 | 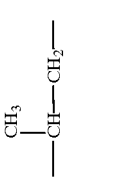 | navy |

TABLE 4-continued

| Example | A | B | Shade |
|---|---|---|---|
| 85 | (structure with HO₃SO—(CH₂)₂—O₂S— phenyl-N=N- naphthalene with NH₂, OH, SO₃H, HO₃S groups, -N=N-phenyl-SO₃H with CH₃) | CH₃—CH—CH₂— | navy |
| 86 | (anthraquinone structure with NH₂, SO₃H, NH-trimethylphenyl-SO₃H) | CH₃—CH—CH₂— | blue |
| 87 | [1:2 Cr complex: (methyl-naphthalene with OH, HO₃S, SO₃H, -N=N-phenyl with OH and O₂N)]₂ Cr | CH₃—CH—CH₂— | grey |

TABLE 4-continued

| Example | A | B | Shade |
|---|---|---|---|
| 88 | [Cu phthalocyanine with SO₂NH-(4-SO₃H-3-methylphenyl), SO₃H, SO₃H, SO₃H substituents] | CH₃–CH(–)–CH₂– | turquoise |
| 89 | [dichloro-diaminophenoxazine with methyl, SO₃H, SO₃H substituents] | CH₃–CH(–)–CH₂– | blue |
| 90 | [naphthalene-1,5-disulfonic acid azo-coupled to H₃COCNH-methylphenyl] | CH₃–C(CH₃)(–CH₂–)–CH₂– | yellow |

TABLE 4-continued

| Example | A | B | Shade |
|---|---|---|---|
| 91 | (structure: pyridone with CH₃, H₂NCO, OH, N-CH₂CH₃, C=O, azo to phenyl bearing CH₃, HO₃S, SO₃H) | —CH(C₂H₅)—CH₂—CH₂— | yellow |
| 92 | (structure: naphthalene with OH, CH₃, SO₃H, HO₃S, azo to phenyl bearing COOH and SO₃H) | —CH₂—CH(CH₃)—CH₂—CH₂—CH₂— | orange |
| 93 | (structure: naphthalene with NH₂, OH, HO₃S, HO₃S, azo to phenyl bearing CH₃, HO₃S) | —(CH₂)₃—O—(CH₂)₄—O—(CH₂)₃— | red |
| 94 | (structure: naphthalene with SO₃H, SO₃H, HO₃S, azo to phenyl bearing CH₃, H₂NCONH) | —CH₂—CH₂— | yellow |

Method Examples 95 to 98

EXAMPLE 95

Mercerized sateen fabric is printed with a print paste containing per kg of print paste 30 g of the dye from Example 1,
100 g of urea,
20 g of sodium carbonate,
500 g of a commercial alginate thickener (®Lamitex M5 6%) and
3 g of antifoam (®Lyoprint AP).

The print is dried for 120 seconds at 150° C. and then rinsed with cold water, washed off in boiling water, rinsed with cold water again and dried.

A yellow print having good allround properties is obtained.

EXAMPLE 96

By proceeding as indicated in Example 95, but using double the amount of urea, there is likewise obtained a yellow print having good allround properties.

By proceeding as indicated in Example 95 or 96, but using instead of 30 g of the dye from Example 1 the same amount of a dye from Examples 2 to 94, there are likewise obtained prints having good allround properties in the shades indicated in each of the corresponding Preparation Examples.

EXAMPLE 97

Causticized viscose fabric is printed with a print paste containing per kg of print paste 30 g of the dye from Example 1,
100 g of urea,
20 g of sodium carbonate,
500 g of a commercial alginate thickener (®Lamitex M5 6%) and
3 g of antifoam (®Lyoprint AP).

The print is dried for 120 seconds at 150° C. and then rinsed with cold water, washed off in boiling water, rinsed with cold water again and dried.

A yellow print having good allround properties is obtained.

EXAMPLE 98

By proceeding as indicated in Example 97, but doubling the amount of urea, there is likewise obtained a yellow print having good allround properties.

By proceeding as indicated in Example 97 or 98, but using instead of 30 g of the dye from Example 1 the same amount of a dye from Examples 2 to 94, there are likewise obtained prints having good allround properties in the shades indicated in each of the corresponding Preparation Examples.

What is claimed is:

1. A method of printing cellulosic fibre material in which the fibre material is brought into contact with a reactive dye of formula:

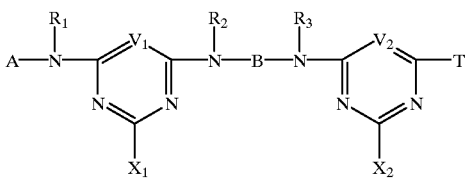

(1)

wherein

A is the radical of a monoazo, polyazo, metal complex azo, anthraquinone, phthalocyanine, formazan or dioxazine chromophore, $R_1$, $R_2$ and $R_3$ are each independently of the others hydrogen or unsubstituted or substituted $C_1$–$C_4$alkyl, $X_1$ and $X_2$ are halogen, B is an organic bridging member, T is a reactive radical of formula:

(2a)

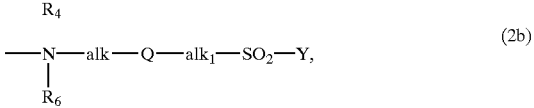

(2b)

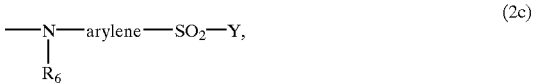

(2c)

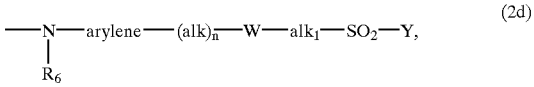

(2d)

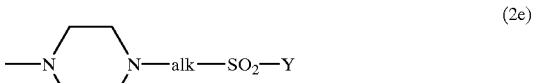

(2e)

or

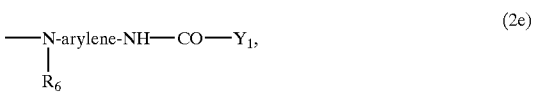

(2e)

$R_4$ is hydrogen, $C_1$–$C_4$alkyl unsubstituted or substituted by hydroxy, sulfo, sulfato, carboxy or by cyano, or a radical

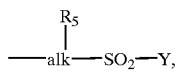

wherein $R_5$ is as defined hereinbelow, $R_5$ is hydrogen, hydroxy, sulfo, sulfato, carboxy, cyano, halogen, $C_1$–$C_4$alkoxycarbonyl, $C_1$–$C_4$alkanoyloxy, carbamoyl or a group —$SO_2$—Y, $R_6$ is hydrogen or $C_1$–$C_4$alkyl, alk and $alk_1$ are each independently of the other linear or branched $C_1$–$C_6$alkylene, arylene is an unsubstituted or sulfo-, carboxy-, hydroxy-, $C_1$–$C_4$alkyl-, $C_1$–$C_4$alkoxy- or halo-substituted phenylene or naphthylene radical, Y is vinyl or a radical —$CH_2$—$CH_2$—U and U is a leaving group, Y₁ is a group —CH(Hal)-CH₂(Hal) or —C(Hal)=CH₂, wherein Hal is chlorine or bromine, W is a group —SO₂—NR₆—, —CONR₆— or —NR₆CO—, wherein R₆ is as defined hereinabove, Q is a radical —O— or —NR₆—, wherein R₆ is as defined hereinabove, n is the number 0 or 1, and V₁ and V₂ are each independently of the other N, C—H, C—Cl or C—F, wherein the fibre material is dried at temperatures of from 125 to 150° C., and the fixing of the printed fibre material is carried out without an additional fixing process step.

2. A method according to claim 1, wherein

R₁ is hydrogen or C₁–C₄alkyl.

3. A method according to claim 1, wherein

R₂ and R₃ are each independently of the other hydrogen, or C₁–C₄alkyl unsubstituted or substituted by hydroxy, sulfo, sulfato, cyano or by carboxy.

4. A method according to claim 1, wherein

B is C₂–C₁₂alkylene that may be interrupted by 1, 2 or 3 members —O— and that is unsubstituted or substituted by hydroxy, sulfo, sulfato, cyano or by carboxy, or is phenylene that is unsubstituted or substituted by C₁–C₄alkyl, C₁–C₄alkoxy, C₂–C₄alkanoylamino, sulfo, halogen or by carboxy.

5. A method according to claim 1, wherein

B is C₂–C₁₂alkylene that may be interrupted by 1, 2 or 3 members —O— and that is unsubstituted or substituted by hydroxy or by sulfato.

6. A method according to claim 1, wherein

B is a radical of formula —CH₂—CH(R₇)—, wherein R₇ is C₁–C₄alkyl.

7. A method according to claim 1, wherein the radical

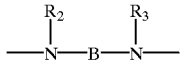

is a radical of formula

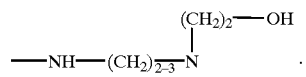

8. A method according to claim 1, wherein

X₁ and X₂ are each independently of the other chlorine or fluorine.

9. A method according to claim 1, wherein one of the radicals X₁ and X₂ is fluorine and the other is chlorine, or X₁ and X₂ are both fluorine.

10. A method according to claim 1, wherein

T is a group of formula:

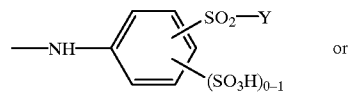

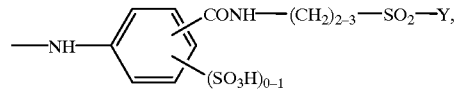

wherein Y is vinyl, β-chloroethyl or β-sulfatoethyl.

11. A method according to claim 1, wherein

V₁ and V₂ are N.

12. A method according to claim 1, wherein the fibre material is dried for from 30 to 120 seconds at from 125 to 150° C.

* * * * *